Patented Dec. 28, 1943

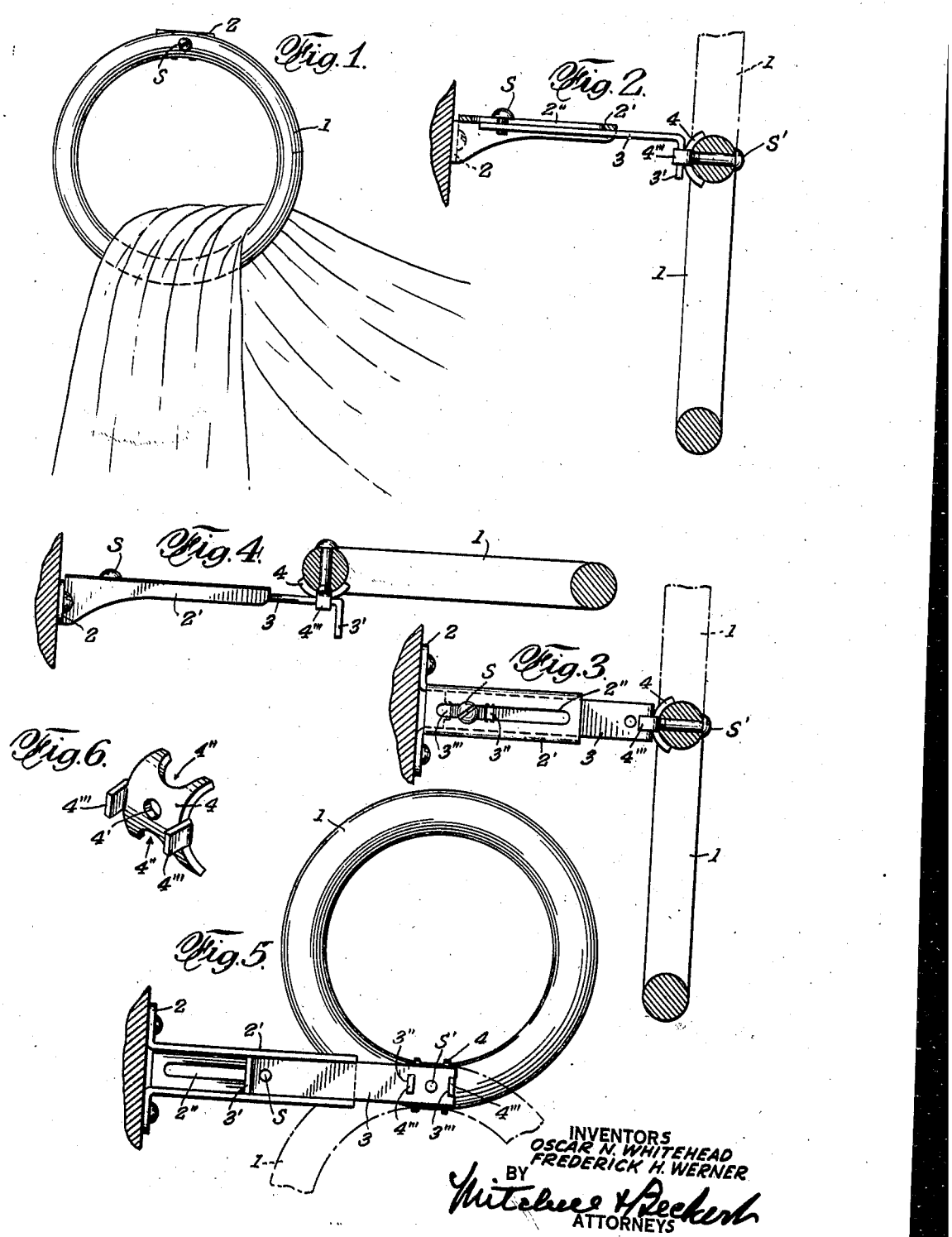

2,337,950

UNITED STATES PATENT OFFICE 2,337,950

FESTOON BRACKET

Frederick H. Werner and Oscar N. Whitehead, Wallingford, Conn., assignors to H. L. Judd Company, Inc., Wallingford, Conn., a corporation of Delaware Application February 19, 1941, Serial No. 379,584

12 Claims. (Cl. 160—330)

This invention relates to drapery supports and consists in a novel form of supporting means for what is termed a "festoon ring."

The object is to provide means whereby the ring may be mounted in a wide variety of positions.

In the accompanying drawing—

Fig. 1 is a front elevation of a festoon ring as it would appear in one position in use;

Fig. 2 is a relatively enlarged side elevation, partly in section, of the parts as shown in Fig. 1;

Fig. 3 is a plan view partly in section showing another position of the parts;

Fig. 4 is a side view partly in section showing another position of the parts;

Fig. 5 is an under side view of the parts in still another position; and

Fig. 6 is a relatively enlarged perspective view of a detail of construction.

I represents a so called "festoon" ring, which is usually of round cross section, although this is not essential. In the use of such rings it is important that they be held in different positions relatively to the supporting wall, to permit varying decorative effects, and the purpose of this invention is to provide means whereby this may be accomplished. In the drawing we have shown the ring as being held in four different positions, although it will be apparent that others are possible. The ring supporting bracket comprises a base 2, adapted to be fastened, either side up, to a supporting wall. It also includes a forwardly extending arm 2l' preferably longitudinally channeled to stiffen it and to also provide a channel to receive the shank portion 3 of a two-piece adapter and to hold it in alignment with said arm. 2" is a longitudinal slot in the arm 2'. One end of the adapter shank 3 has a short or right-angle offset 3'. There is a screw hole provided in each end of the shank 3 and a similar screw hole in the offset 3'. In the position shown in Figs. 2, 3 and 4 a screw S engages the screw hole in the rear end of the shank 3, to hold it to the bracket arm 2'. In Fig. 5 the shank 3 is shown as reversed, with said screw S engaging in the screw hole of the shank next to the offset 3'. By loosening the screw S the shank 3 may be adjusted to and fro to vary spacing of the ring I from the wall. In the middle of the offset 3' there is another similar screw hole to receive a screw S', which passes freely through the ring body I to hold the latter to the offset 3', as shown in Figs. 2 and 3. In Fig. 4 this screw S' takes into the screw hole in the shank 3 adjacent to the offset end 3'. In Fig. 5 this screw S' takes into the screw hole in the shank at the opposite end from the offset 3', the shank being shown in this view as reversed from that shown in the other figures. The second part of the adapter is shown as relatively enlarged in Fig. 6, in which 4 is the arc-shaped body thereof, having a central screw passage 4', through which the screw S' may freely pass. This arc-shaped body provides a seat for the ring, as shown in Figs. 2, 3 and 4. The end edges of this body 4 may also be recessed, as at 4"—4", to form another ring seat at right angles to the first mentioned seat. The body 4 may also have two rearwardly extending ears 4"'—4"', spaced to straddle the shank 3 or the offset 3'. In case a ring I of round cross section is used this second part of the adapter is useful in providing a proper bearing seat therefor. In some cases, should that part of the ring I have a flattened side toward the bracket, this second part of the adapter might be omitted.

If the ring is to be positioned down or up relatively to the bracket and parallel to the wall, the screw S' is passed through a hole in the ring and through the hole 4' in the second adapter part, and then into the screw hole in the shank offset 3', all as shown in Fig. 2. If the ring I is to be extended laterally from the bracket and parallel to the wall, the screw S' is removed, the part 4 is turned on the offset 3' to the position shown in Fig. 3. If the ring is to be positioned in a horizontal plane and outstanding from the bracket the second part 4 of the adapter is secured in place on that part of the shank 3 adjacent to the offset 3', as shown in Fig. 4. If the ring I is to be positioned at a right angle to the wall and upstanding relatively to the bracket, the parts are assembled as in Fig. 5. When the second part of the adapter is positioned on the opposite end of the shank from the offset 3' and with the ears 4"'—4"' in line therewith, as shown in Fig. 5, we provide a clearance passage 3" in the shank for one of said ears, and we also preferably provide an end notch 3"'. These ears prevent rotation of part 4 on screw S'.

From the foregoing it is apparent that the means described permits a very wide range of adjustments for the purpose of firmly holding the festoon ring at any desired position relatively to or distant from the main supporting wall. In the drawing we have shown only four of these positions, which we deem ample to fully disclose the invention. Obviously the bracket base may be secured to the wall, either side or either end up, as desired. We realize that various other changes and modifications may be made while still being within the spirit and scope of the invention as described and claimed.

We claim:

1. A drapery ring support, comprising a bracket, an adapter part comprising an arm carried thereby and having an offset at one end, a second adapter part shaped to form a seat for said ring, and means for securing said second adapter part to said offset to face outwardly and to the side of said arm adjacent to said offset to face laterally.

2. A drapery ring support, comprising a bracket, an adapter part comprising an arm carried thereby and having an offset at one end, a second adapter part shaped to form a seat for said ring, and means for securing said second adapter part to said offset to face outwardly and to the side of said arm adjacent to said offset to face laterally, said adapter arm being reversible on said bracket, said second adapter part being securable to the other end of said arm remote from said offset when the arm is in reversed position on said bracket.

3. A drapery ring support, comprising a bracket, an adapter part comprising an arm carried thereby and having an offset at one end, a second adapter part shaped to form a seat for said ring, and means for securing said second adapter part to said offset to face outwardly and to the side of said arm adjacent to said offset to face laterally, said adapter arm being reversible on said bracket, said second adapter part being securable to the other end of said arm remote from said offset when the arm is in reversed position on said bracket, said second part being securable thereon in two different positions.

4. A drapery ring support, comprising a bracket, an adapter part comprising an arm extensibly carried thereby and having an offset at one end, a second adapter part shaped to form a seat for said ring, and means for securing said second adapter part to said offset to face outwardly and to the side of said arm adjacent to said offset to face laterally.

5. A drapery ring support, comprising a bracket, an adapter part comprising an arm carried thereby and having an offset at one end, a second adapter part shaped to form two seats for said ring, and means for securing said second adapter part to said offset to face outwardly and to the side of said arm adjacent to said offset to face laterally.

6. A drapery ring support, comprising a bracket, an adapter part comprising a forwardly extending arm having a right angle offset end, a second adapter part shaped to form a seat for said ring, with means to attach said ring and second adapter part to said offset end in a plurality of different positions and also to the side of said arm in a plurality of different positions.

7. A drapery ring support, comprising a bracket, an adapter part comprising a forwardly extending arm having a right angle offset end, a second adapter part shaped to form two seats for said ring, with means to attach said ring and second adapter part to said offset end in a plurality of different positions and also to the side of said arm in a plurality of different positions.

8. A drapery ring support, comprising a bracket, an adapter part comprising a forwardly extending arm having a right angle offset end, a second adapter part shaped to form a seat for said ring, with means to attach said ring and second adapter part to said offset end in a plurality of different positions and also to the side of said arm in a plurality of different positions, and means to prevent said second adapter part and ring from rotating on said arm.

9. A drapery ring support, comprising a bracket, an adapter part comprising a forwardly extending arm having a right angle offset end, a second adapter part shaped to form a seat for said ring, with means to attach said ring and second adapter part to said offset end in a plurality of different positions and also to the side of said arm in a plurality of different positions, and means to prevent said second adapter part and ring from rotating on said arm, said means comprising ears on opposite edges of said second adapter part.

10. A drapery ring support, comprising an adapter shaped to form seating means for a ring, a seating support for said adapter, and a common means for securing said ring and adapter and seating support together.

11. An adapter for a drapery ring, comprising a plate member having flanges to form a seat for a ring to sustain the latter against rotation about a diametral axis, said flanges being notched to form a seat for the ring and hold the same at right angles to the position of a ring held in the first mentioned seat.

12. In the combination defined in claim 11, said adapter having means for engagement with a support to hold the adapter against rotation.

FREDERICK H. WERNER.
OSCAR N. WHITEHEAD.